United States Patent
Russo

[11] Patent Number: 6,073,322
[45] Date of Patent: Jun. 13, 2000

[54] BORING MACHINE FOR BORING AND WELDING

[76] Inventor: Evangelista Russo, Contrada La Petrizia, Strada Statale, 106 88050 Sellia Marina (Catanzaro) -, Italy

[21] Appl. No.: 08/973,409
[22] PCT Filed: Jul. 25, 1995
[86] PCT No.: PCT/IT95/00128
  § 371 Date: Dec. 1, 1997
  § 102(e) Date: Dec. 1, 1997
[87] PCT Pub. No.: WO97/04912
  PCT Pub. Date: Feb. 13, 1997
[51] Int. Cl.[7] .................. B23Q 5/04; B23B 39/28
[52] U.S. Cl. .................. 29/26 A; 29/560; 228/48; 408/238; 409/231
[58] Field of Search .................. 29/26 R, 26 A, 29/560; 219/76.14; 228/48; 408/22, 24, 238; 409/231, 233

[56] References Cited

FOREIGN PATENT DOCUMENTS 0 088 305  1/1988  European Pat. Off. .

*Primary Examiner*—William Briggs
*Attorney, Agent, or Firm*—Michael J. Striker

[57] ABSTRACT

The boring machine according to the present invention, that may be applied onto the piece to be bored and suitable for performing welding surfacing on the same point to be bored, inside or outside, with working performed in automatic or semi-automatic, comprises:

a tubular box inside which a shaft may be inserted, guided by an engine bushing that allows the rotation and the longitudinal moving of a tool head-carrying shaft, a manual supporting handle for transport;

three motoreducers, fed with direct current and installed inside said bonnet;

three engines, for the rotation of the head-carrying tool shaft, for the forward and backward advancement of the head-carrying tool shaft in the boring phase, and for the welding surfacing distribution phase of eventual pieces to be re-treated, allowing the rotation of the torch by continuous wire welding at very low revolutions that may be electronically varied;

a screw placed on the tool-carrying head, for the manual advancement of the tool;

a device for the rotating connection of a torch.

10 Claims, 7 Drawing Sheets

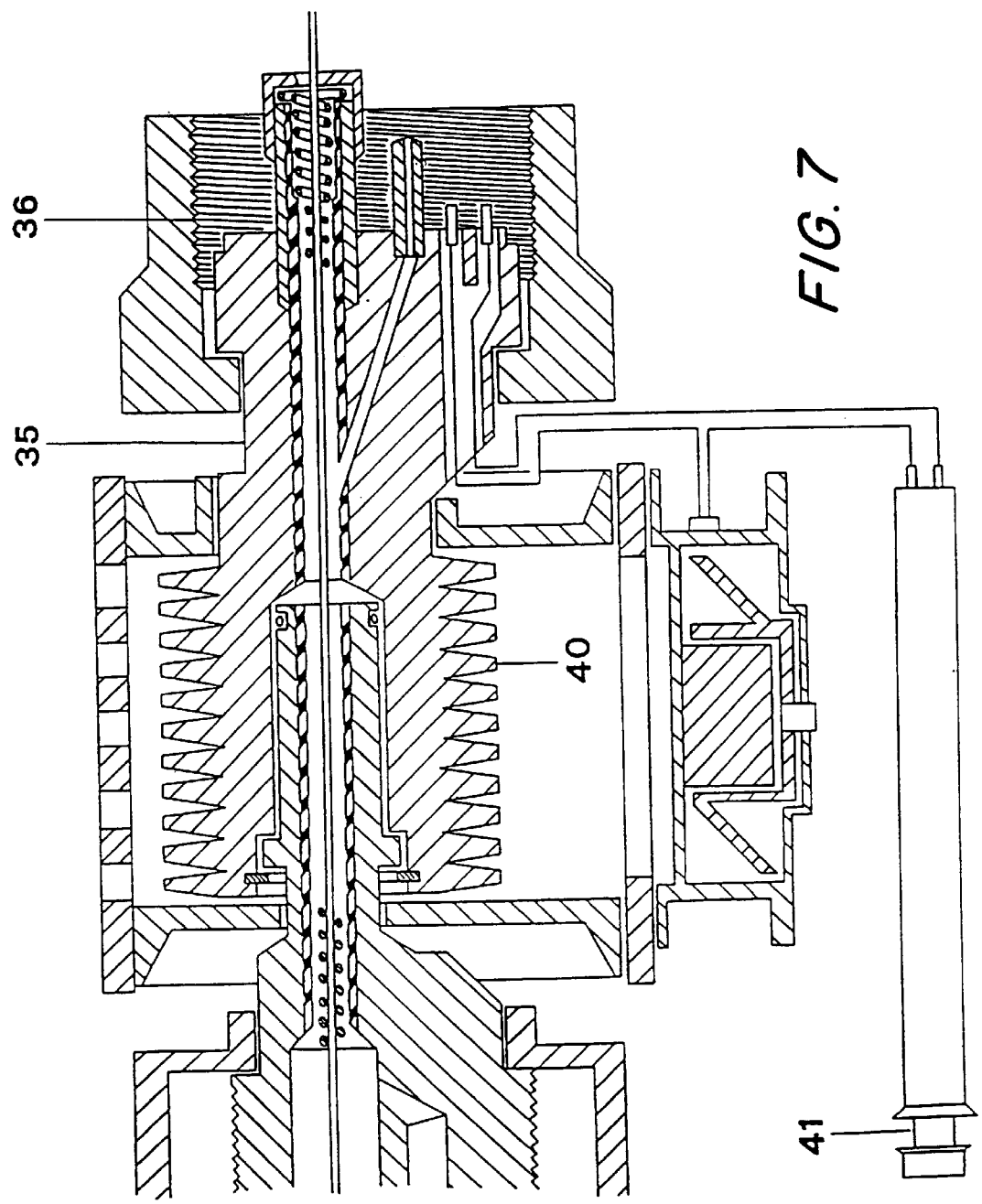

BORING MACHINE FOR BORING AND WELDING

The present invention concerns a boring machine for performing the boring of holes, the surfacing of weldings in said holes, the lateral levelling, siger slots and boring by means of locoidal points, in automatic or semi-automatic with one single placement.

It is already well known that the existing boring machines are rather heavy and therefore can not be moved, and therefore the pieces to be repaired must be disassembled and brought to specialized centres, with consequent heavy time and money losses.

For what concerns electric boring machines, those with continuous wire show the inconvenience that they involve the twist of the flexible tubular structure when the surfacing of the material must be performed for particular parts of the piece, e.g. inside cavities or similar, that request the rotation of the working portion of one or more complete revolutions. For avoiding such twist, which is particularly problematic when welding surfacings onto cylindric surfaces are performed, is becomes necessary to subject the piece to be treated to a continuous rotation which of course requires complex operations and special technical means, due to the difference of shape and dimension of the different pieces and to the different placement of the parts to be treated.

For overcoming said problems, devices have been realized that put the working part of the torch into rotation, providing also a rotating joint between said working part and the flexible tubular structure, so that the rotation imparted to the working part will not be transmitted to said structure.

An example of such a device has been described in European Patent no. EP 0088305, in which the use of a fix body, rigidly carried by the flexible tubular structure and operatively jointed with a rotating body, consisting of the same working part of the torch. In the bodies—fix and rotating—one or more canalizations are provided which have the function of a guide for the continuous wire and of feeding of the protective gas.

Appropriate creeping contacts provide for the necessary electric continuity between one connection conductor provided in the flexible tubular structure, and the working part of the torch, for leading tension to the welding wire.

However, it must be underlined that above described devices allow the sole performance of weldings in automtic, and disadvantageously request the replacing of the conventional welding torch with a new torch with a working part rotatingly unlinked from the flexible tubular structure.

It is the aim of the present invention to realize a universal portable boring machine, for performing boring works and the distribution of weldings in automatic and semi-automatic, outside and inside bling and passing holes with different dimensions.

The aim set forth is reached by means of a boring machine according to the present invention, that may be applied onto the piece to be bored, and that is provided for performing welding surfacings in the same point to be bored, internal or external, with a working performed in automatic or in semi-automatic, comprising:

- a tubular box inside which a shaft may be inserted, guided by an engine bushing that allows the rotation and the longitudinal moving of a tool head-carrying shaft, so that by means of one head having the function of tool-carrier, inserted onto the shaft during the rotation and the longitudinal moving of the same, it is possible to perform the horizontal and vertical borings, the levelling of faces and housings for sigers, in automatic or in semi-automatic, at the desired point;
- a mechanism closed in a bonnet efficaciously fixed onto said box, on which a handle is provided for moving the same from one work to the other in workshops or in yards;
- three motoreducers, fed with direct current and installed inside said bonnet;
- an engine that performs the rotation of the head-carrying tool shaft at a plurality of mechanic speeds, the rotation inversion by means of an electric converter, the variation of revolutions by means of an electronic potentiometer;
- a second engine that performs the forward and backward advancement of the head-carrying tool shaft in the boring phase, with the possibility of varying the revolutions by means of an electronic potentiometer, and inverting the longitudinal moving sense of the head-carrying tol shaft by means of an electronic inverter;
- a third engine that will be operated in the welding surfacing distribution phase of eventual pieces to be re-treated, allowing the rotation of the torch by continuous wire welding at very low revolutions that may be electronically varied by operating an electronic potentiometer in such a way that, by means of the operation of the second motoreducer, it is possible to perform the advancement of said torch, which will be connected passing inside the tubular structure of the perforated carrying shaft and by means of a rotating tubular mechanism which, tightening two small bolts, determins the blocking as well as the release of the perforated torch-carrying shaft which therefore allows the rotation as well as the longitudinal advancement of the torch in the welding surfacing phase as well as in the head-carrying tool shaft, in the boring phase, eventually by means of the passing and threaded holes, blocked in the carrying tubular shaft;
- a screw placed on the tool-carrying head, by means of which it is possible to advance the tool manually with centesimal movements by means of reading a nonius engraved on its disk;
- a device for the rotating connection of a torch comprising: a connection head carried by the terminal of the fix body and removably connectable to the connection sleeve to said connection head, ending up at a first longitudinal channel that may be connected in axial prosecution relation with one outlet seat of a continuous wire, provided in said connection sleeve, and at least one connection joint communicating with said first longitudinal channel and that may be coupled with one outlet seat of protective gas, provided in said connection sleeve; a connection sleeve carried at the terminal of the rotating body at the side opposite to the fix body and operatively connectable to the terminal head shown from said flexible sheathing to said connection sleeve, ending up at a second longitudinal channel and extending coaxially onto the prosecution of said first longitudinal channel and connectable in axial prosecution relation with one inlet seat of the continuous wire provided in said terminal head, so that said device is removably engageable between the connection sleeve of the welding machine and the terminal head of the welding torch sheathing.

The advantages of the device according to the present invention have already been described.

The present invention will be described more in detail hereinbelow relating to the enclosed drawings in which some embodiments are shown.

FIG. 7 shows an enlarged section for illustrating, in greater detail, the realizing details of the rotating device shown in FIG. 6.

Figure 1:
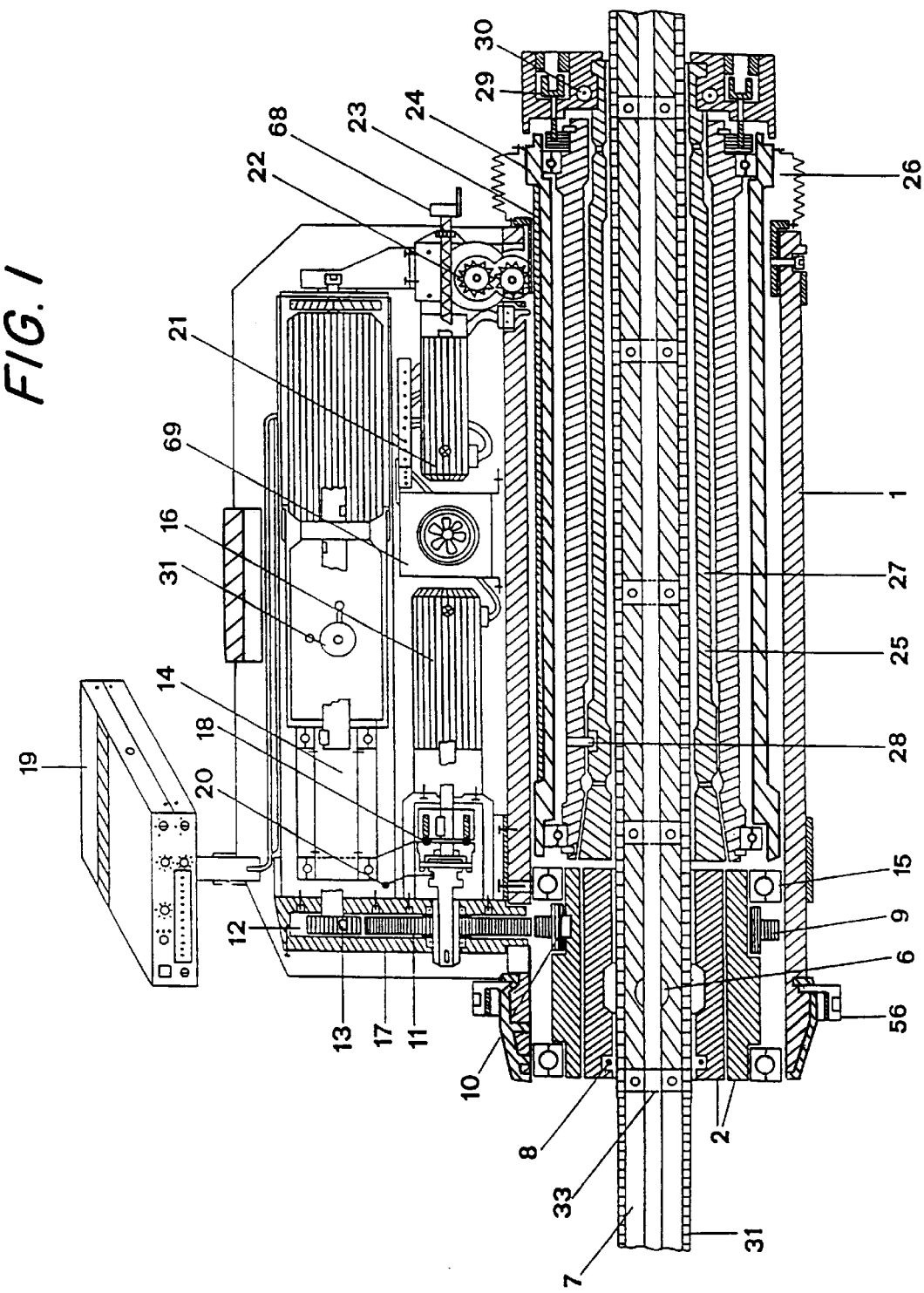
FIG. 1 shows a vertical section of the engine group of a universale portable boring machine for performing welding works and welding distribution in automatic, inside and outside blind and passing holes.
Figure 2:
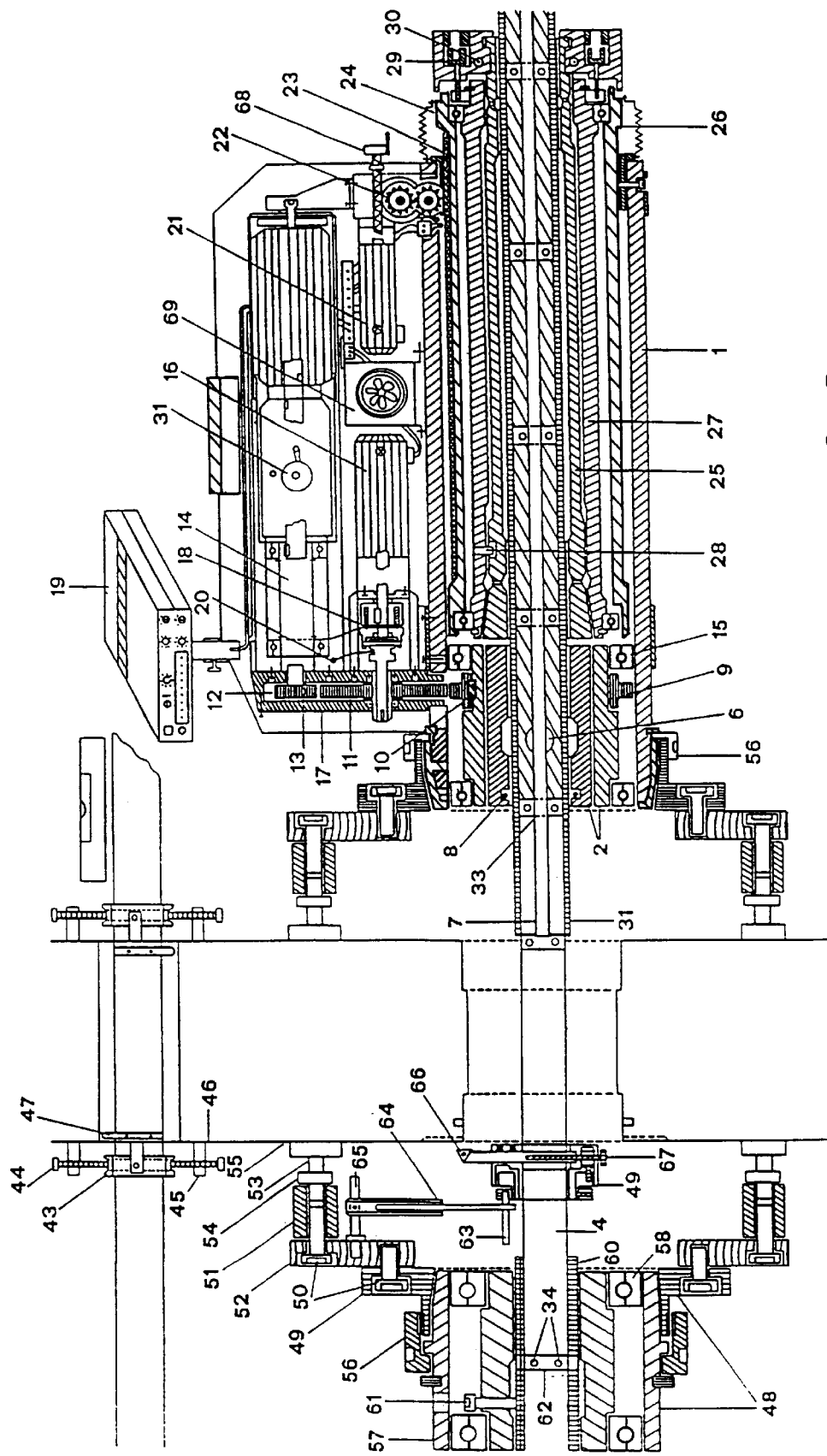
FIG. 2 shows the installation of the device according to the present invention, as a boring machine, with details shown in FIG. 3.
Figure 3:
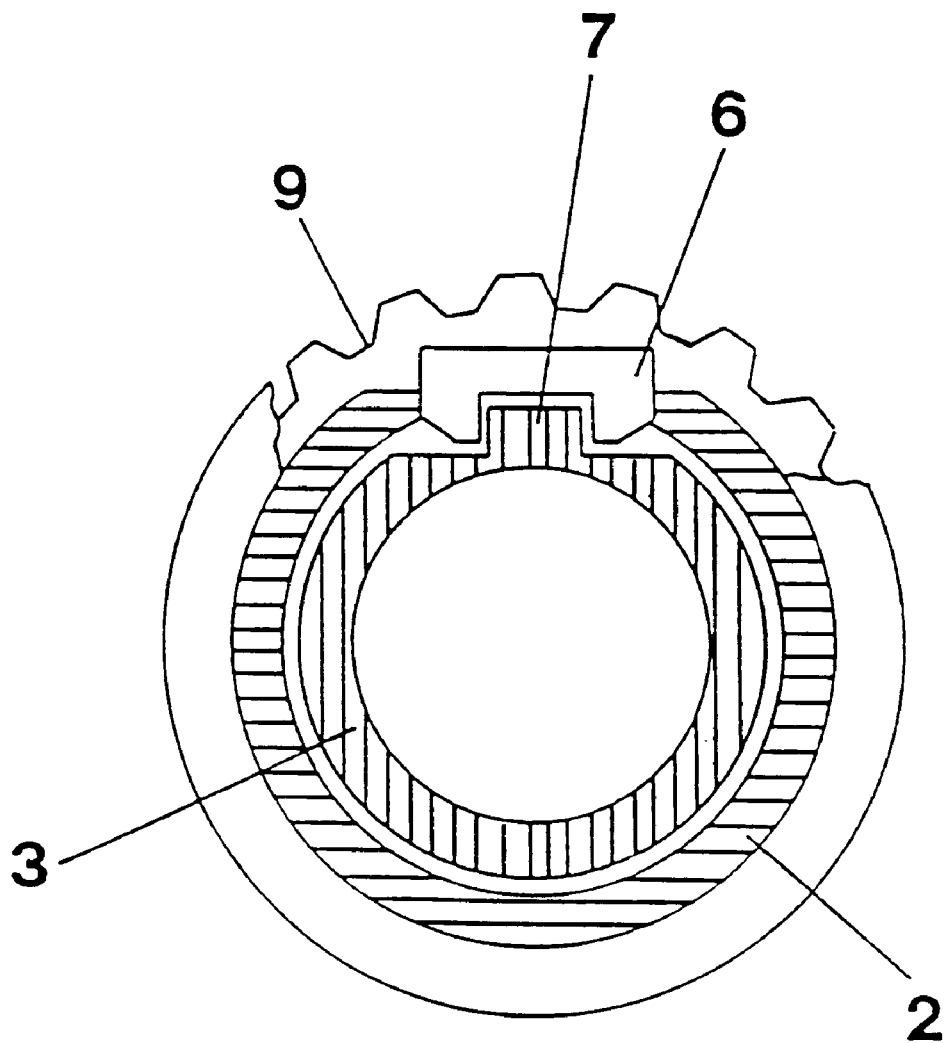
Figure 4:
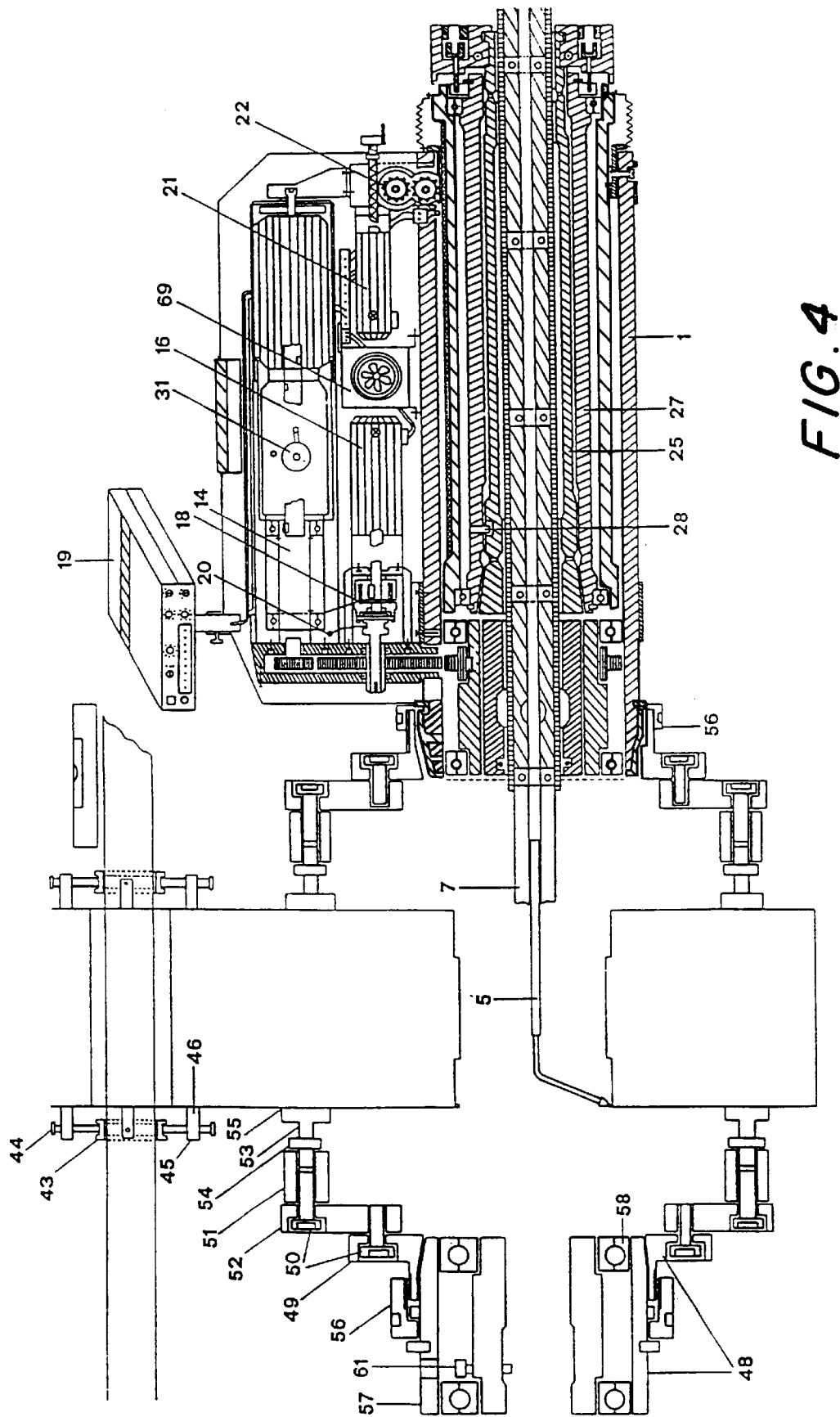
FIG. 4 shows the installation of the device according to the present invention as a welding distributor.
Figure 5:
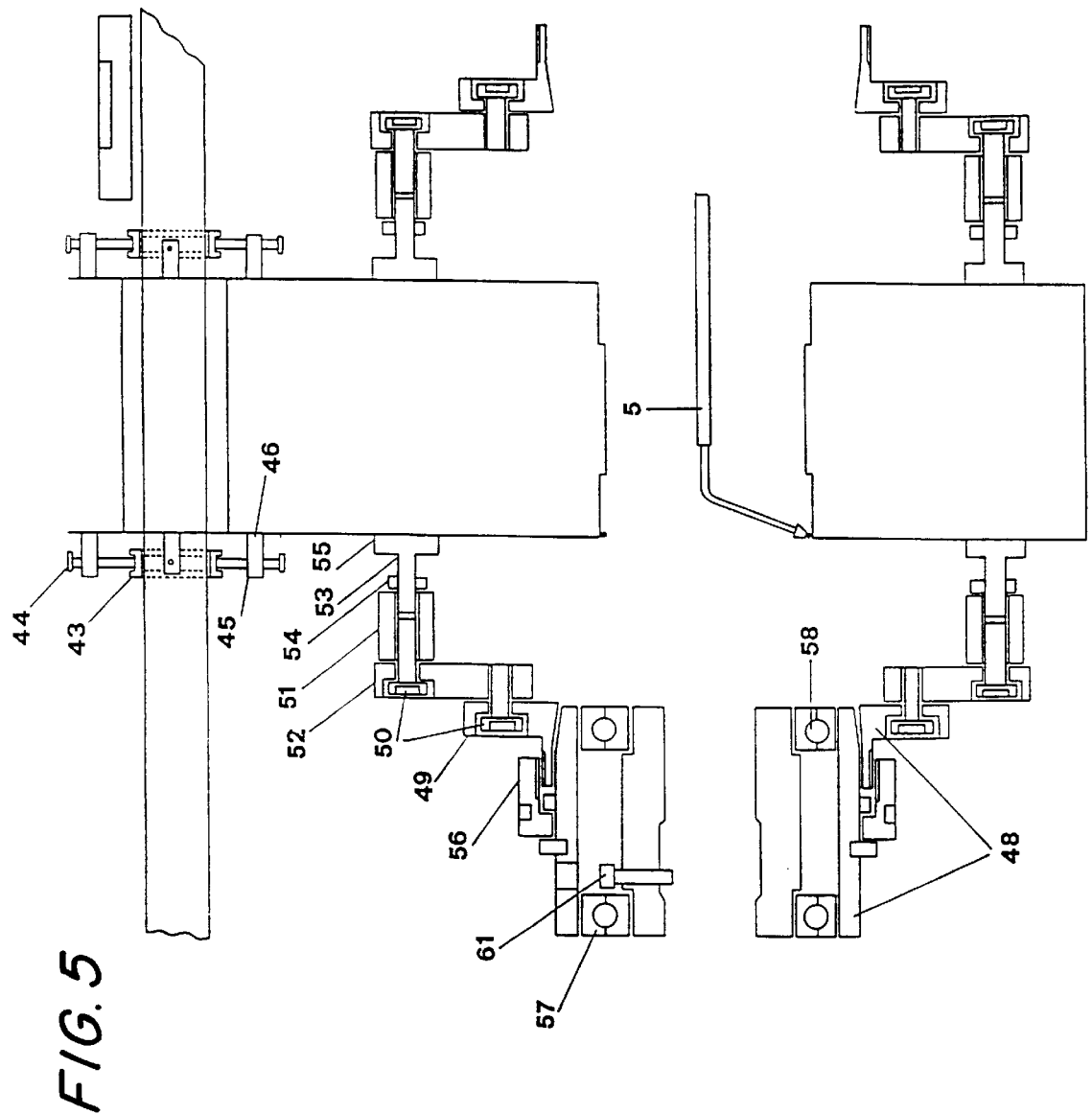
FIG. 5 shows the constitutive details of the welder.

The enclosed figure show a universal portable boring machine, for performing boring works and welding distribution in automatic, outside and inside blind and passing holes of various diameters, with the passage of the tool-carrying shaft inside the machine with unlimited working run, comprising:

a tubular box 1, inside which and at one terminal the motor hub 2 is mounted, that allows the rotation of the carrying perforated shaft 3 and that in turn allows the rotation onto the head-carrying tool shaft 4 and the rotation of the torch 5 for the welding surfacing;

a hollow key 6, a piece of which projects from said motor hub 2 so as to determine the rotation of the carrying perforated shaft 3 by means of the key with full shaft 7, obtained onto the perforated carrying shaft 3 and with an O-ring 8 for allowing the cleaning of the shaft during the longitudinal sliding in advancing phase inside the motor hub 2 and the box 1;

a gear 9 mounted outside said motor hub 2, provided with a stop with a key 10, for the connection with the intermediate gear 11 for the connection with the gear 12, mounted with a key 13 onto the motor shaft 14 so that, when said motor 14 is operated, said hub 2 rotates with the terminal bearings 15;

a motoreducer 16, installed onto the distribution box 17, between the motor 14 and the box 1, provided with a mechanic revolution reducer and a ball and spring clutch 18, operated by a switch, and a revolution varying device, housed onto the central 19 and connected, by means of an appropriate lever 20 in the welding surfacing phase, with a clutch group 18 realized in such a way as to allow, during the working of the welding surfacing, the sliding of the traction should the torch get blocked, for avoiding eventual breaking of the same;

a rotating mechanism, mounted inside the back part of said box 1, that allows at the same time the longitudinal moving of the perforated carrying shaft 3 for performing the rotation of the motor hub 2, by means of the motoreducer 14 and the connection of the gear 9 onto gears 11, 12, by means of the motoreducer 21, with the gears 22 placed onto the rack rod 23, fixed onto the guide element 24, and the rotation of the element 25 together with the carrying perforated shaft 3, with the bearings 26, while the element 24 remains still in the rotation sense;

a further element 27 provided, in its front part, with a conic shape, and a cylindric part onto which a stop pin 28, anti-twist with element 25, is mounted during the advancement rotation, and with the conic parts of elements 25, 27 realized fro performing the blocking of the perforated carrying shaft 3, for allowing the rotation and the longitudinal advancement during the phase of the various workings and in such a way that unscrewing screw 29, 30 onto the blocking mechanism of the perforated carrying shaft 3, the blocking of the element 25, 27 may be performed onto said perforated carrying shaft 3 while, for performing the release of said shaft, it is sufficient to block the two screws.

For what concerns the functionality of the device according to the present invention in its possible variants, it is possible to perform:

the welding surfacing, inserting inside the perforated carrying shaft 3 the torch of the continuous wire welder 31 and operating the motoreducer 16, 21, after having blocked the perforated carrying shaft 3 by means of screws 29, 30, putting the ball-grip of the change gear 32 of the motoreducer 14 in neutral and operating the small lever 20 of the motoreducer 16, and operating at the same time the motoreducers 16, 21;

the boring of the parts surfaced by welding, putting the motoreducer 16 of the welder in neutral by means of the small lever 20 and inserting the desired gear by means of the ball-grip of the change gear 32 of the motoreducer 14, taking off the torch and inserting into the same housing the head-carrying tool shaft 4 and, by means of the insertion of a cylindric pin into one of the existing holes 33 of the head-carrying tool shaft and on the hole existing on the perforated carrying shaft 3, blocking said pin by means of two sheathings threaded onto holes existing onto the head-carrying tool shaft.

Figure 6:
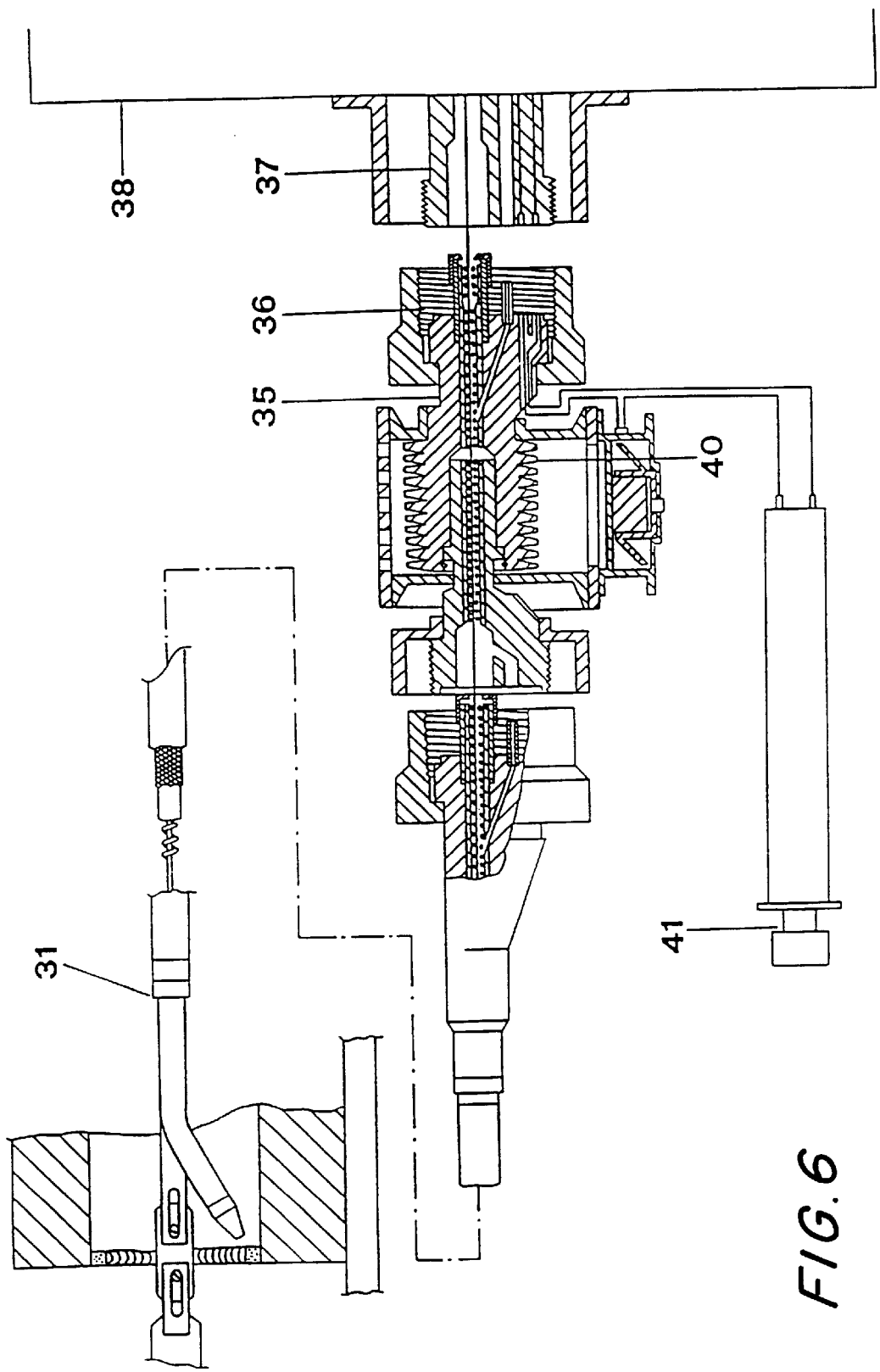
FIG. 6 shows, in an interrupted section and in exploded view, a variant of the device according to the present invention concerning the assemblying of a torch for the continunous wire welding surf acing.

In the variant shown in FIGS. 6 and 7, the device for the rotating connection of a torch to a continuous wire welder, comprises a fix body 35 having a head 36 for the connection to the conventional connection sleeve 37 provided in welder 38, and a connection sleeve that may be engaged by the terminal head connected to a conventional welding torch. The fix and rotating bodies 39 are crossed by a first hole 40 and by a second longitudinal channel, through which the continuous welding wire, coming from sleeve 37 for the connection to said welder, is guided. Also a connection coupling is linked to the connection head, that may be engaged with a respective seat provided in connection sleeve 36, 37 for feeding protective gas into the longitudinal channels; the electric continuity between the connection sleeve and the terminal head of the torch is provided by operating switch 41 for the ignition of the welder, through the fix and movable bodies realized out of electrically conductive material.

After having fixed the tool carrying head 42 onto the head-carrying shaft 4, the boring phase may be performed as well as lateral lavellings and siger joints. Furthermore, during boring on passing-through holes it is suggested to install a plurality of supports for the holding of the shaft on the side opposite to the boring machine.

For what concerns the installation of the boring machine in a position central to the hole to be re-treated, the system for centering on the working point is in any case always the same:

on bushes 43, once the bolts 44 are screwed with the terminals 45 placed one on one side and one on the other side of the working piece, fixed in the welding points 46, said bolts 44 are unscrewed from both sides taking them off, and rotating the bushes 43 the tool carrying shaft 4 is inserted, said shaft being provided with holes 33 for above mentioned centering as well as for the hooking of said perforated carrying shaft placed inside the boring machine;

in the holes 33 of said shaft—realized for performing said centering as well as the hooking of said perforated carrying shaft placed inside the boring machine 3, in the centering phase a small pin 47 is inserted so that when the shaft is manually rotated the walls of the hole to be treated are skimmed and, through the adjusting of the bolts 44 of the centering system, the same centering of above mentioned shaft 4 is obtained; onto the same shaft, and from both sides one or more supports for the holding of the shaft 48 must be inserted according to the working needs, whereby one of said supports is always used for the support of the boring machine, and provided with a flange with holes 49 so that, by means of bolts 50 and spacers 51, onto which brackets 52 rotatingly adjusted are assembled, said flanges may be blocked;

once said operation has been performed, and while the support 48 remains on the shaft, the bolts 53 are adjusted onto the wall to be treated by pushing them fore- or backwards by means of the screw-thread, and blocked by the lock nuts 54 so that, with a part of substantial welding between the head of the bolt 55 and the wall to be treated, said supports remain fixed onto said wall;

when said operation has been performed on both sides, the centering system must be elininaed, taking off the shaft so that the sole supports of the shaft and of the boring machine remain on the wall to be treated;

on that side, where the boring machine is to be fixed, the internal rotating group or the support must be taken off, and in that housing the boring machine must be inserted so that, through the locking of the threaded ring nut 56, the locking of said boring machine is obtained on the point to be treated in a position centered to the hole to be re-treated; in case of blind holes only one support is needed for working, i.e. the sole boring machine is used which on its side replaces the rotating part of the internal support 57 as, in such cases, it is impossible to use the second support in the pase of welding surfacing and boring.

Above mentioned supports 48 with a transferable inside, are realized with the shell 57 and inside the bearings 58 are inserted, and inside said bearing a guide bush 59 is provided and inside said bush a further bush 60 which, during rotation, is out of one piece with the tool carrying shaft that has a bush 60 with a screw 61, and during the advancement in the working phase, said bush 60 moves, together with the head-carrying tool shaft, in longitudinal sense as it is provided with a small key, so that during rotation bush 60 has the possibility of rotating together with bush 59 and of moving longitudinally together with the shaft, as said bush 60 is fixed to the head-carrying tool shaft by the connection with a small pin 62 and said small pin is fixed by means of threaded sheathings 34 so that said bush is out of one piece with the head-carrying tool shaft.

Consequently, said bush 60 is realized for reinforcing the holding of the shaft during the boring working, as well as the carrying bush 3 placed inside the boring machine.

The small arms 63, 64, 65 are used for performing the automatic advancement of the tool carrier 66 during the levelling operation, making siger joints, operating only the motoreducer 14 for the shaft's rotation, without operating the advancement motoreducer. After having performed the first levelling, the return of the tool into the tool carrying head may be performed manually, by means of a screw 67, placed on the body of the tool carrying head, or inverting the rotation of the shaft in automatic by means of an electronic inverter.

For increasing the second levelling it is possible to move in centesimal steps the special handwheel 68, provided on the back part of the boring machine, connected on the motoreducer 21.

The boring machine according to the present invention is cooled down by conditioned air by means of suitable cooling fans provided on the driving-axle. Furthermore, with the installation of an additional fan 69, at the centre of the boring machine, the suction of the warm air, produced by the electric engines, is obtained leading it outside the bonnet that encloses the whole mechanism for the protection of the operator and of the mechanisms.

The lubrication of all rotating elements is provided with a tight system exempted of periodical checks.

The extension of the head-carrying tool shafts is composable by special adjustments male-female and safety key in conical expansion.

The end of the total run of the advancement mechanism 70, in one sense or in the other, is limited by two electronic run ends fixed backwards to the body 1 of the boring machine and by a mechanical anti-jamming clutch.

The advancement depth required time by time during working, in boring as well as in welding surfacing, is programmed by the electronic control panel, with display. Also the rotation sense, the revolution speed and the advancement speed and the use instructions in various languages is stored on the same central panel, and in case of need the informations concerning the performance of the working phases and of fixing of the machine can be shown on the display.

The advancement mechanism is protected by a rubber antioil bellows against dust.

What is claimed is:

1. A universal portable automatic boring and welding machine for performing boring and welding distribution inside and outside blind and through holes, comprising a tubular box; three nested hollow shafts arranged in said tubular box and located coaxially, said shaft including a first internal hollow shaft, a second intermediate hollow shaft which surrounds said internal hollow shaft, and a third external hollow shaft; a pair of roller bearings separating said roller shaft from each other; a hollow tool carrying shaft with means for supporting one of a boring tool, a tool carrying head and a welding torch and inserted through said first internal hollow shaft; a plurality of electric motors located above said tubular box; said third external hollow shaft being free to translate longitudinally, said tool carrying shaft emerging freely from both ends of said tubular box and having a length longer than a length of said tubular box, said tool carrying shaft being formed with holes and having a projecting key along a length which is coupled with a hollow key in a tubular hub located inside a front end of said tubular box; a gear mounted outside said tubular hub and rotatable alternatingly by one of said electric motors, said one electric motor having a ball and a spring clutch which allows automatic release of a motion; said one electric motor which has said clutch being a low speed motor, said electric motors including an electric ratio motor with a kinematic group of rotation provider which effect a longitudinal translation of said third external hollow shaft and including a gear which meshes with a rack rod fixed to said third external hollow shaft; a dorsal truncated cone-shaped expanded section provided on front of said first internal hollow shaft and corresponding to a truncated cone-shaped depression provided on a front of said second intermediate hollow shaft; a manually operated pulling device which subjects said first internal hollow shaft to an action and is operative for locking said tool carrying shaft by said truncated cone-shaped depression at the front end of said second intermediate hollow shaft against said truncated cone-shaped expanded section at an end of said first internal hollow shaft, and said expanded section due to elastic deformation presses against said tool carrying shaft.

2. A universal portable automatic boring and welding machine as defined in claim 1, wherein said expanded section is perforated to provide an elastic deformation.

3. A universal portable automatic boring and welding machine as defined in claim 1, wherein said expanded section is thinner than a remaining portion to provide elastic deformation.

4. A universal portable automatic boring and welding machine as defined in claim 1; and further comprising electronic potentiometers which control said electric motors to vary a revolution speed; and an electronic invertor for reversing a longitudinal moving sense.

5. A universal portable automatic boring and welding machine as defined in claim 1, wherein said welding torch is connected to a continuous wire welder by a head of a coupling screwed to a body freely rotated on a fixed body which is screwed by a threaded ring onto a coupling of the welder, a continuous hole being aligned for passage of the continuous wire and for supply of protective gas.

6. A universal portable automatic boring and welding machine as defined in claim 1, wherein said tubular box has a front end forming a freely turning ring nut with an internal threading; and further comprising a centering device which is received in said internal threading and has a flange screwed to said ring nut, said flange being connected to bases welded to a wall face of a workpiece which has a hole to be repaired; a second centering device which is similar to said first mentioned centering device and applied on an opposite wall face, said second centering device having a ring nut which is mounted free to rotate on a bush which is free to rotate by a couple of ball bearings on an internal bush which receives a perforated shaft, a pin inserted on said perforated shaft, said perforated shaft being manually rotated, arms being manually moved until pin schemes during rotation, so that an internal surface of the hole is repaired; and bolts which are subsequently fixed to arms and spacers.

7. A universal portable automatic boring and welding machine as defined in claim 1; and further comprising an auxiliary shaft provided inside a hole; a bushing placed on each face of a wall of the hole and passing through said auxiliary shaft; bolts which are screwed into brackets welded into the walls and which support said auxiliary shaft so that with a level and adjustment of said bolts, a position of said auxiliary shaft is regulated so that said tool carrying shaft is centered on the machine measuring its distance from its auxiliary shaft before the machine is mounted.

8. A universal portable automatic boring and welding machine as defined in claim 1; and further comprising a centering device which receives a small arm connected by a tie rod to another small arm which in turn is connected to said tool carrying head for performing automatic forward operation of leveling plane surfaces using only the motor for the rotation movement, so that after the leveling operation has been completed, said tool is returned into a starting position manually by a screw placed on a body of said tool carrying head.

9. A universal portable automatic boring and welding machine as defined in claim 1; and further comprising a centering device which receives a small arm connected by a tie rod to another small arm which in turn is connected to said tool carrying head for performing automatic forward operation of leveling plane surfaces using only the motor for the rotation movement, so that after the leveling operation has been completed, said tool is returned into a starting position manually by automatic inverting a rotation of said shaft by an electronic inverter.

10. A universal portable automatic boring and welding machine as defined in claim 1; and further comprising two electronic run ends positioned at a rear end of said tubular box and a mechanical anti-jamming clutch formed so that an end of a total run in one sense or in the other is limited by said two electronic run ends and said mechanical entry-jamming clutch.

* * * * *